(12) United States Patent
Xue et al.

(10) Patent No.: US 9,586,394 B2
(45) Date of Patent: Mar. 7, 2017

(54) FIXTURE FOR ON-LINE WHEEL PRINTING

(71) Applicant: CITIC Dicastal CO., LTD, Qinhuangdao (CN)

(72) Inventors: Bowen Xue, Qinhuangdao (CN); Jiandong Guo, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 0 days.

(21) Appl. No.: 15/074,569

(22) Filed: Mar. 18, 2016

(65) Prior Publication Data

US 2016/0311215 A1 Oct. 27, 2016

(30) Foreign Application Priority Data

Apr. 24, 2015 (CN) .......................... 2015 1 0199450

(51) Int. Cl.
*B65G 47/248* (2006.01)
*B41F 17/00* (2006.01)

(52) U.S. Cl.
CPC .................................. *B41F 17/006* (2013.01)

(58) Field of Classification Search
CPC .................... B60B 2310/656–2310/658; B60B 2340/30–2340/32; B41F 7/28
See application file for complete search history.

*Primary Examiner* — Joshua D Zimmerman
(74) *Attorney, Agent, or Firm* — Hamre, Schumann, Mueller & Lason, P.C.

(57) ABSTRACT

The present invention relates to a fixture for on-line wheel printing, which is composed of a stand, a servo motor, a flip plate, air cylinders and the like. When in use, the fixture provided by the present invention can meet the requirement for quickly printing a pattern on a fixed window of wheel on line, and meanwhile, has the characteristics of advanced technology, high automation degree, safe and stable performance.

1 Claim, 3 Drawing Sheets

FIXTURE FOR ON-LINE WHEEL PRINTING

FIELD OF THE INVENTION

The present invention relates to a fixture, and in particular to a fixture for on-line wheel printing.

BACKGROUND OF THE INVENTION

With the requests of some customers, the front face of a buffed wheel needs to be printed with a logo pattern to enhance a visual effect thereof. However, in order to prevent the buffed wheel from being scratched, this work is not only extremely low in efficiency, but also very inconvenient for manual operation. A traditional printing method is that a worker places the wheels on a fixing fixture one by one and then adjusts the angle of the fixture for printing. The present invention proposes to realize on-line treatment of this work, which can not only realize high efficiency but also prevent scratches.

SUMMARY OF THE INVENTION

An object of the present invention is to provide a fixture for on-line wheel printing, which can meet the requirement for quickly printing a pattern on a fixed window of wheel on line.

In order to achieve the object described above, a technical solution of the present invention is as follows: a fixture for on-line wheel printing is composed of a stand, a cross plate, a turnover air cylinder, a servo motor, a flip plate, a guide rail I, a sliding plate, left bearing seats, left shafts, left clamping blocks, a clamping air cylinder, right bearing seats, right shafts, right clamping blocks, a connecting rod, a sliding block and a guide rail II. The cross plate is fixed on the stand; the sliding block is fixed above the cross plate through the guide rail II, and an output rod of the turnover air cylinder, which is fixed above the cross plate in a similar way, is connected with the sliding block; two ends of the connecting rod are respectively hinged with the sliding block and the flip plate; the right side of the flip plate is hinged with the stand; the sliding plate above which two left bearing seats are fixed are connected with the flip plate through the guide rail I; two left shafts of which upper ends are respectively fixed with the left clamping blocks are fixed inside the left bearing seats through the bearing; the servo motor is fixed below the sliding plate, and an output end of the servo motor is connected with one of the left shafts; the clamping air cylinder is fixed above the flip plate, and an output end of the clamping air cylinder is connected with the sliding plate; the right shafts of which output ends are respectively fixed with the right clamping blocks are fixed inside the right bearing seats above the flip plate through the bearing.

During actual use, a sensor is used to position a wheel on a roller way; the clamping air cylinder drives the sliding plate and the two left clamping blocks to push the wheel to a right side through the guide rail I; the wheel can be clamped when coming into contact with the two right clamping blocks; the servo motor drives the wheel to rotate through the left shafts; the sensor recognizes the position of an air valve hole and then identifies a corresponding wheel window position; the turnover air cylinder drives the flip plate and the wheel to turn over by a certain angle through the sliding block, the guide rail II and the connecting rod. At the moment, a printing head of a pad printer moves downwards to print a fixed pattern onto a front face of the wheel.

When in use, the fixture can meet the requirement for quickly printing a pattern on a fixed window of wheel on line, and meanwhile, has the characteristics of advanced technology, high automation degree, safe and stable performance.

Figure 1:
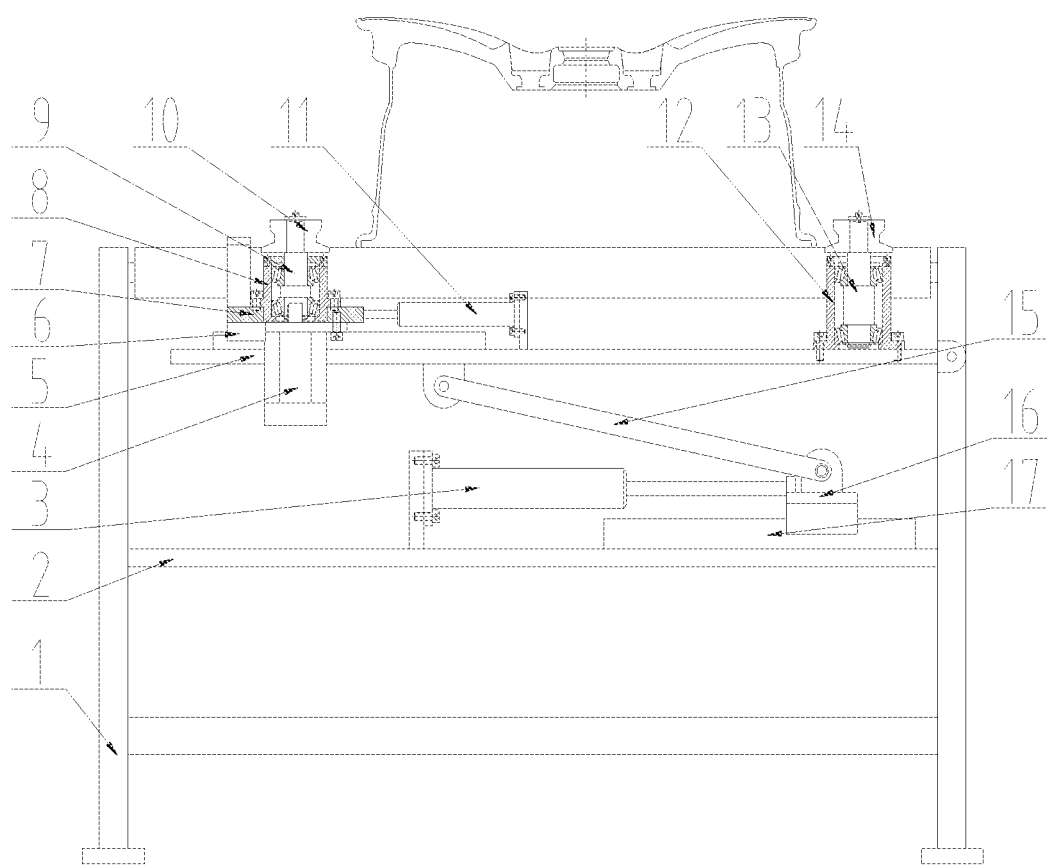
FIG. 1 is a front view of a fixture for on-line wheel printing.
Figure 2:
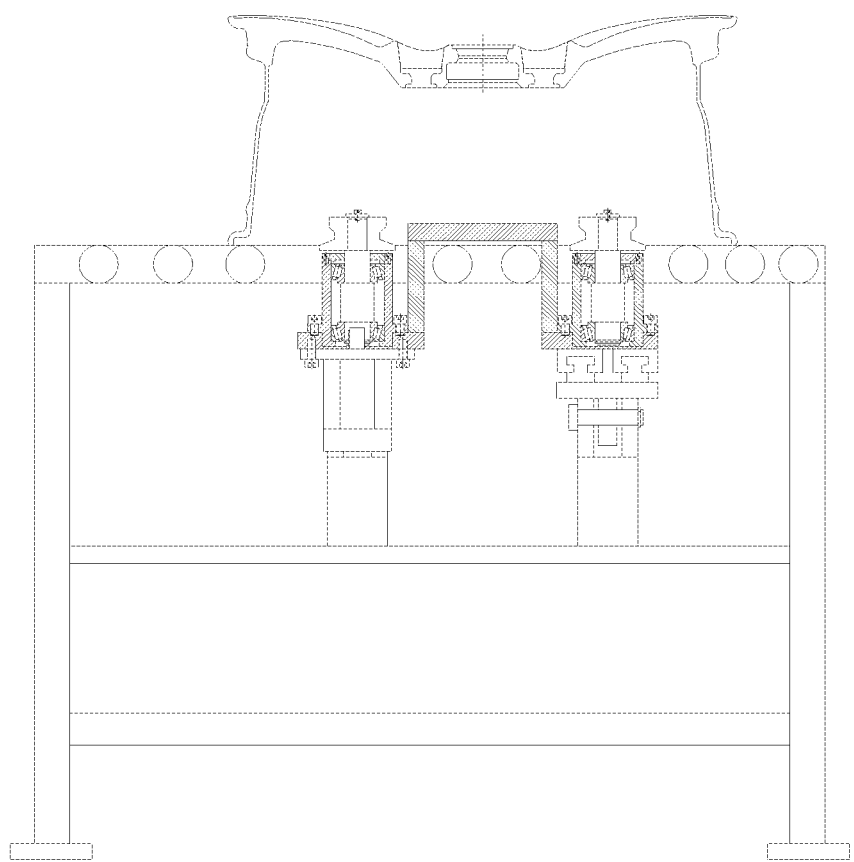
FIG. 2 is a left view of a fixture for on-line wheel printing.
Figure 3:
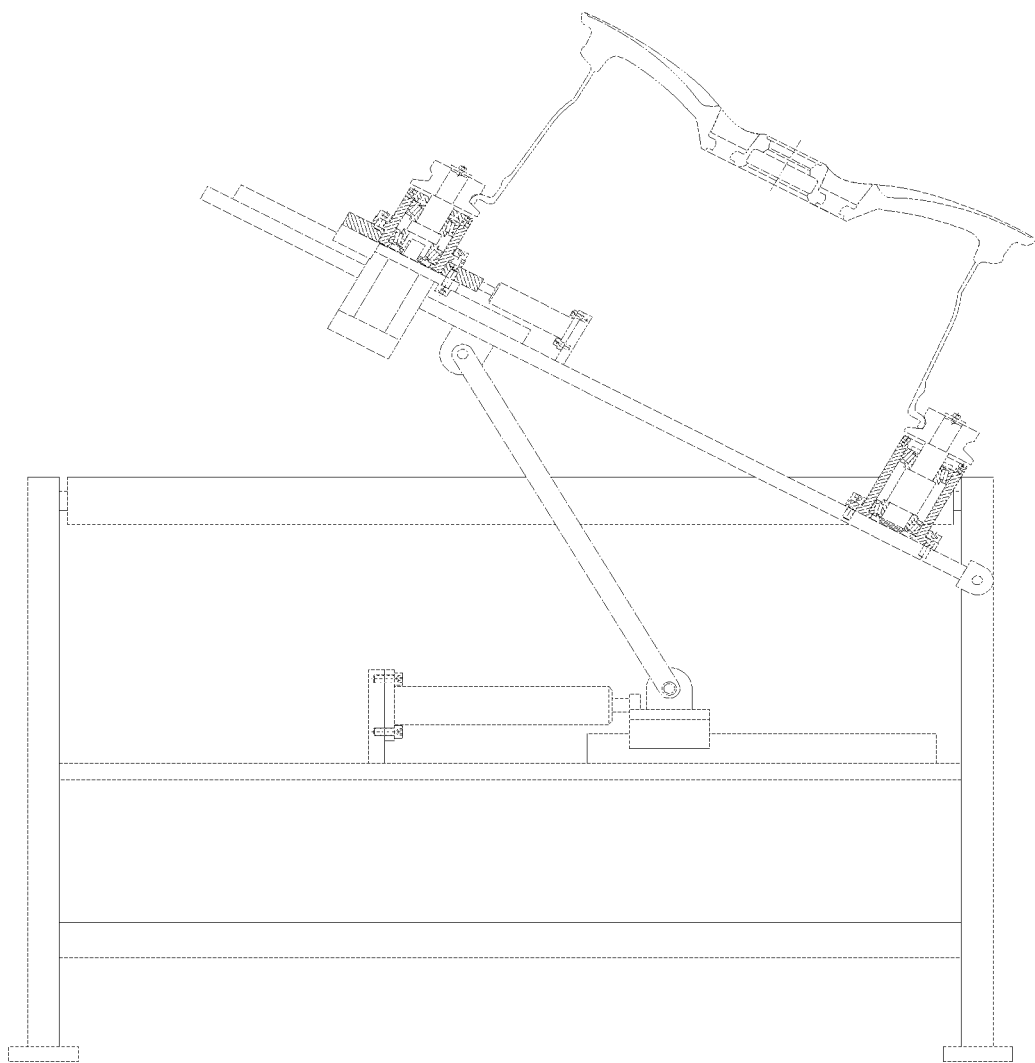
FIG. 3 is a front view of a fixture for on-line wheel printing during working.

In the figures, numeric symbols are as follows: 1—stand, 2—cross plate, 3—turnover air cylinder, 4—servo motor, 5—flip plate, 6—guide rail I, 7—sliding plate, 8—left bearing seat, 9—left shaft, 10—left clamping block, 11—clamping air cylinder, 12—right bearing seat, 13—right shaft, 14—right clamping block, 15—connecting rod, 16—sliding block, and 17—guide rail II.

DETAILED DESCRIPTION OF THE INVENTION

In the following, the details and working conditions of a specific device provided by the present invention are described in combination with the figures.

The fixture is composed of a stand 1, a cross plate 2, a turnover air cylinder 3, a servo motor 4, a flip plate 5, a guide rail I 6, a sliding plate 7, left bearing seats 8, left shafts 9, left clamping blocks 10, a clamping air cylinder 11, right bearing seats 12, right shafts 13, right clamping blocks 14, a connecting rod 15, a sliding block 16 and a guide rail II 17. The cross plate 2 is fixed on the stand 1; the sliding block 16 is fixed above the cross plate 2 through the guide rail II 17, and an output rod of the turnover air cylinder 3, which is fixed above the cross plate 2 in a similar way, is connected with the sliding block 16; two ends of the connecting rod 15 are respectively hinged with the sliding block 16 and the flip plate 5; the right side of the flip plate 5 is hinged with the stand 1; the sliding plate 7 above which two left bearing seats 8 are fixed are connected with the flip plate 5 through the guide rail I 6; two left shafts 9 of which upper ends are respectively fixed with the left clamping blocks 10 are fixed inside the left bearing seats 8 through the bearing; the servo motor 4 is fixed below the sliding plate 7, and an output end of the servo motor 4 is connected with one of the left shafts 9; the clamping air cylinder 11 is fixed above the flip plate 5, and an output end of the clamping air cylinder 11 is connected with the sliding plate 7; the right shafts 13 of which output ends are respectively fixed with the right clamping blocks 14 are fixed inside the right bearing seats 12 above the flip plate 5 through the bearing.

In a working process, a sensor is used to position a wheel on a roller way; the clamping air cylinder 11 drives the sliding plate 7 and the two left clamping blocks 10 to push the wheel to a right side through the guide rail I 6; the wheel can be clamped when coming into contact with the two right clamping blocks 14; the servo motor 4 drives the wheel to rotate through the left shafts 9; the sensor recognizes the position of an air valve hole and then identifies a corresponding wheel window position; the turnover air cylinder 3 drives the flip plate 5 and the wheel to turn over by a certain angle through the sliding block 16, the guide rail II 17 and the connecting rod 15. At the moment, a printing head of a pad printer moves downwards to print a fixed pattern onto a front face of the wheel.

The invention claimed is:

1. A fixture for on-line wheel printing, which comprises a stand, a cross plate, a turnover air cylinder, a servo motor, a flip plate, a guide rail I, a sliding plate, left bearing seats, left shafts, left clamping blocks, a clamping air cylinder, right bearing seats, right shafts, right clamping blocks, a connecting rod, a sliding block and a guide rail II; characterized in that the cross plate is fixed on the stand; the sliding block is fixed above the cross plate through the guide rail II, and an output rod of the turnover air cylinder, which is fixed above the cross plate in a similar way, is connected with the sliding block; two ends of the connecting rod are respectively hinged with the sliding block and the flip plate; the right side of the flip plate is hinged with the stand; the sliding plate above which two left bearing seats are fixed are connected with the flip plate through the guide rail I; the two left shafts of which upper ends are respectively fixed with the left clamping blocks are fixed inside the left bearing seats through the bearing; the servo motor is fixed below the sliding plate, and an output end of the servo motor is connected with one of the left shafts; the clamping air cylinder is fixed above the flip plate, and an output end of the clamping air cylinder is connected with the sliding plate; the right shafts of which output ends are respectively fixed with the right clamping blocks are fixed inside the right bearing seats above the flip plate through the bearing.

* * * * *